United States Patent [19]

Mohs

[11] Patent Number: 5,252,000

[45] Date of Patent: Oct. 12, 1993

[54] FREE PRODUCT COLLECTOR AND METHOD

[75] Inventor: Clifford E. Mohs, Minneapolis, Minn.

[73] Assignee: Timothy E. Mohs, Minneapolis, Minn.

[21] Appl. No.: 903,340

[22] Filed: Jun. 24, 1992

[51] Int. Cl.⁵ .................. E02B 15/04; E21B 43/02
[52] U.S. Cl. ............................ 405/53; 166/369; 210/170; 210/747; 405/52; 405/128
[58] Field of Search .............. 166/369; 405/128, 129, 405/52, 53; 210/693, 747, 170

[56] References Cited

U.S. PATENT DOCUMENTS

| 3,774,685 | 11/1973 | Rhodes | 166/369 |
| 5,080,781 | 1/1992 | Evins, IV | 166/369 X |
| 5,098,221 | 3/1992 | Osborne | 405/52 |
| 5,156,743 | 10/1992 | Muncriet | 210/693 X |
| 5,173,092 | 12/1992 | Rudder | 405/52 X |

Primary Examiner—William P. Neuder
Attorney, Agent, or Firm—Leo Gregory

[57] ABSTRACT

A device disposed within a monitoring well in a fuel filling station environmental area to collect for withdrawal from said well fuel leakage from reservoir or storage tanks present in the area.

10 Claims, 3 Drawing Sheets

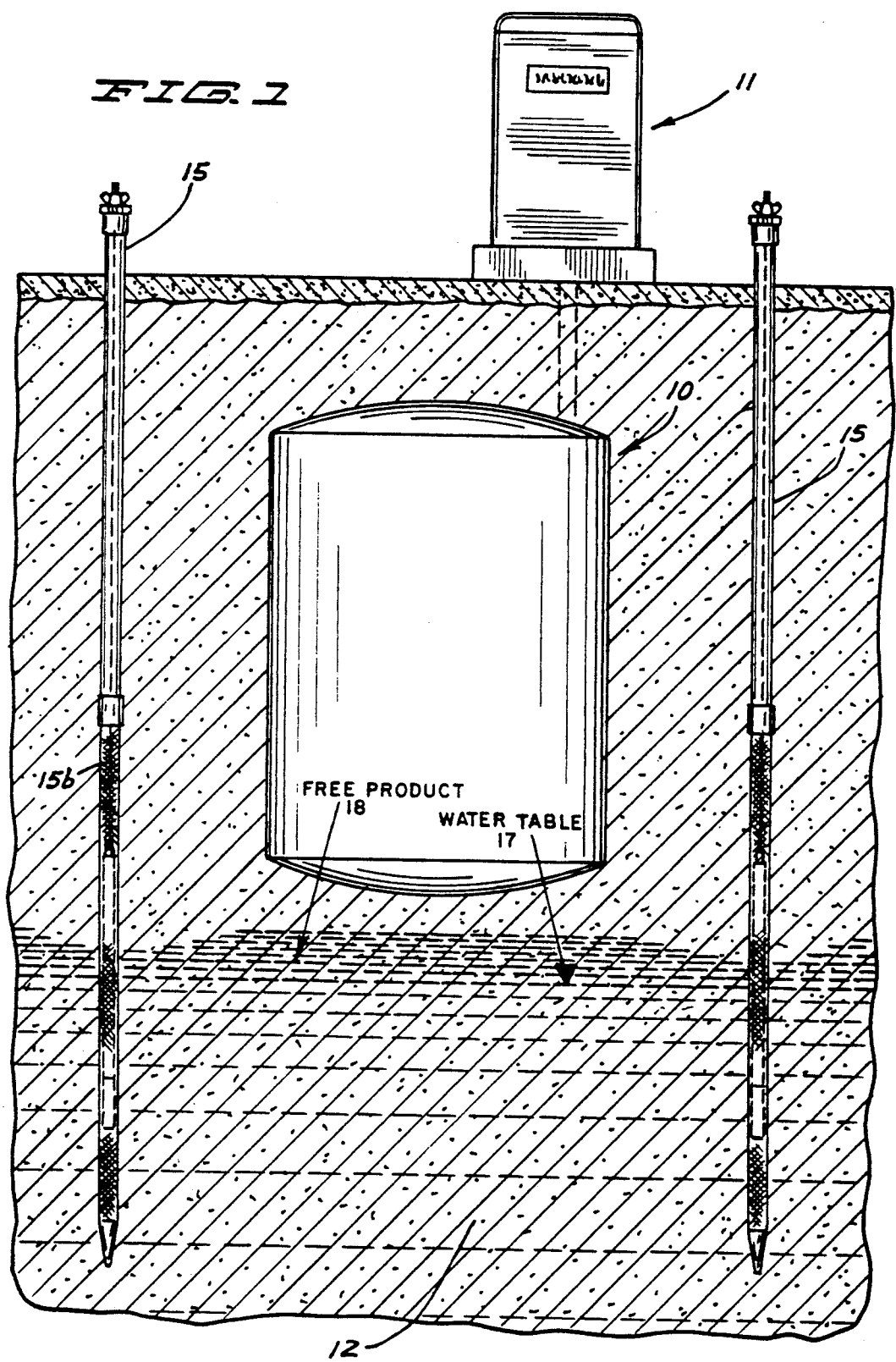

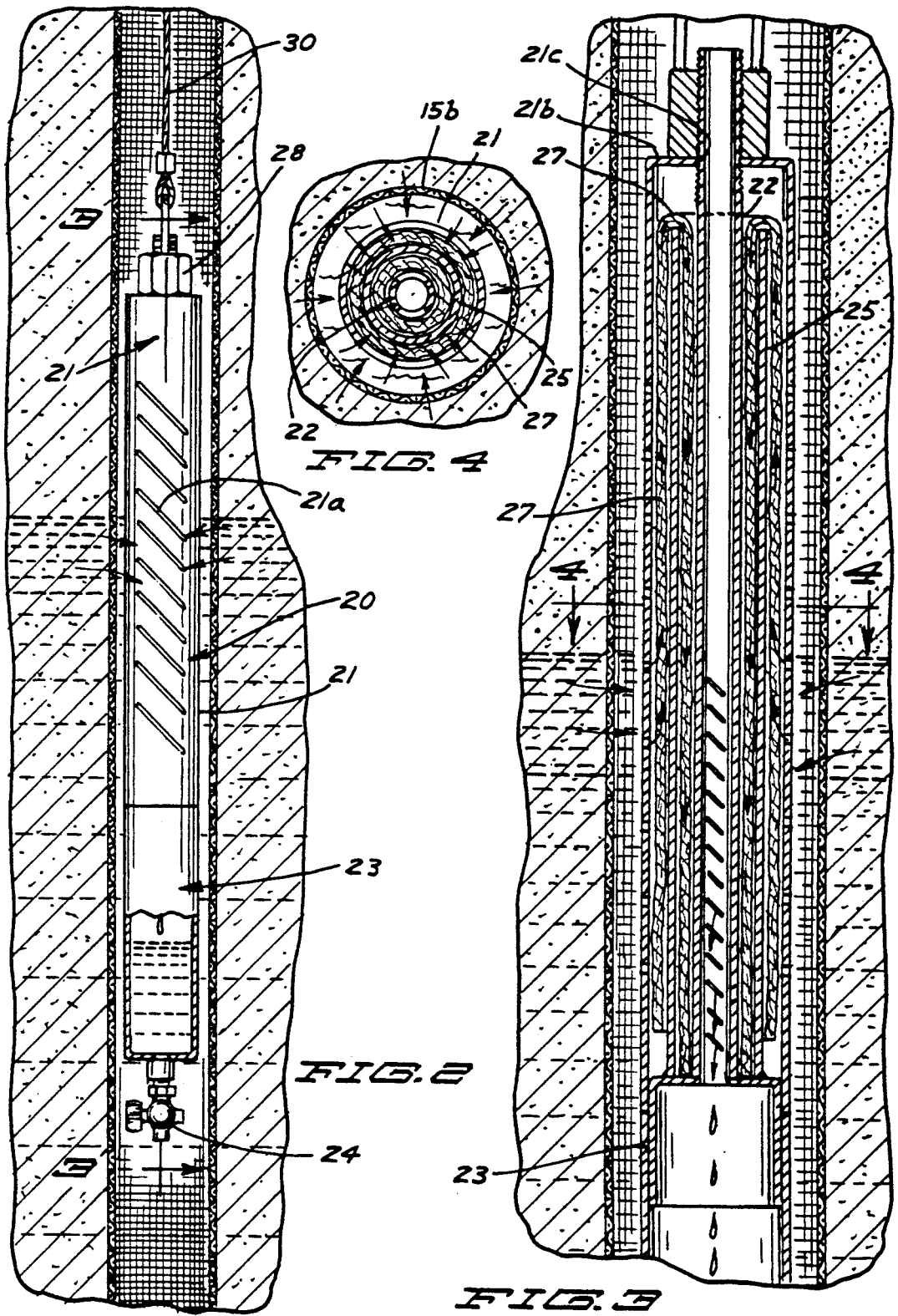

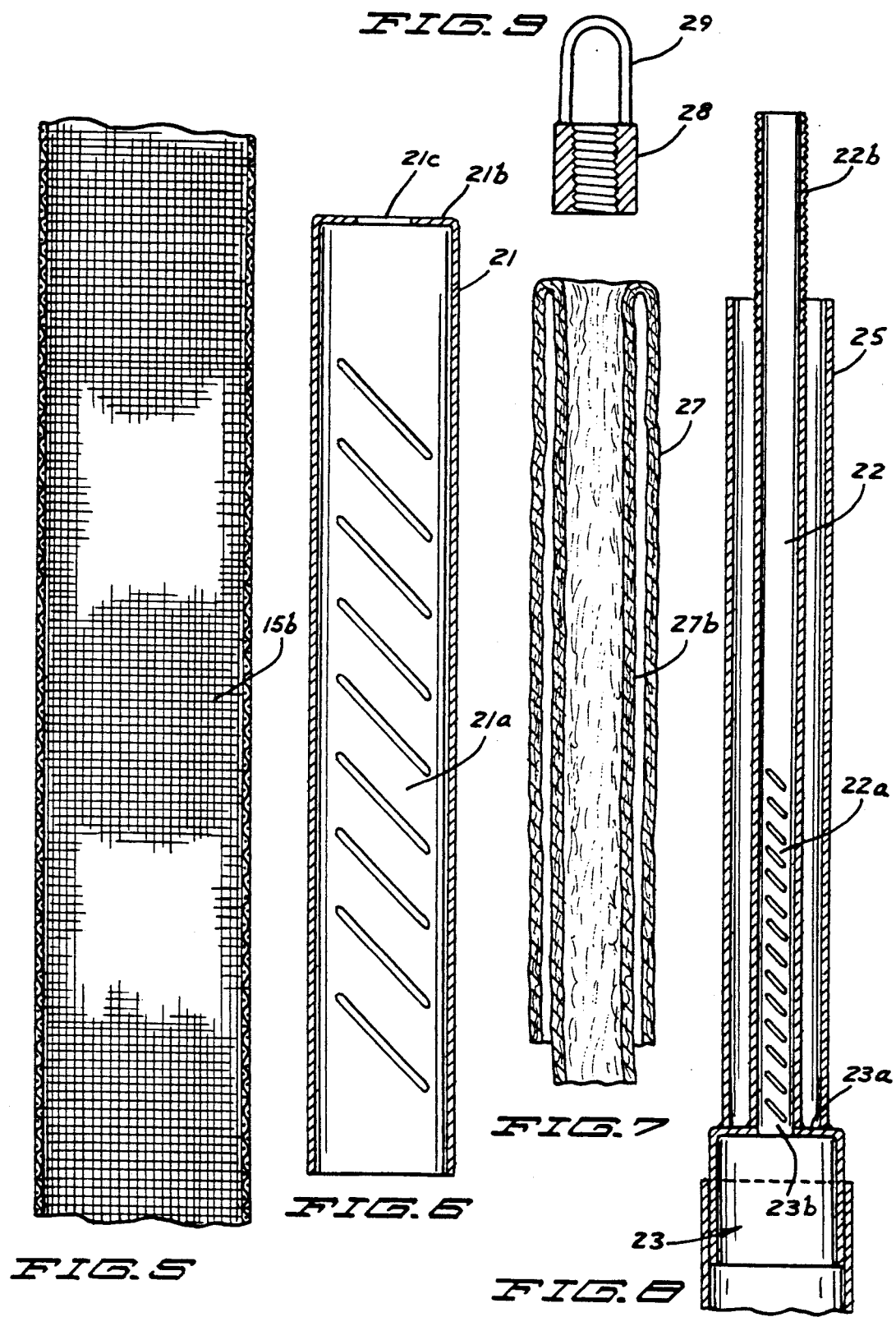

FREE PRODUCT COLLECTOR AND METHOD

BACKGROUND OF THE INVENTION

1. Field of Invention

This invention relates to passively collecting, for removal, floating liquid phase petroleum distillate mixtures, such as gasoline, fuel oils, light grade oils and the like, from environmental waters, in particular but not exclusively, from groundwaters in investigative monitoring wells.

2. Brief Description Of The Prior Art

A large environmental problem exists from the widespread use of petroleum distillate products, such as gasoline, fuel oils and the like. These petroleum mixtures when released into the environment cause a number of problems.

Gasoline is an example of a major petroleum mixture that is routinely released into the environment. The gasoline used at vehicle service stations is typically stored in underground storage tanks. These tanks and the plumbing connecting them to pumps routinely leak. Once released into the soil, leakage migrates until it contacts the water table or some other impermeable substrata. The gasoline being lighter than water will float and spread across the water continuing its flow in the direction of least resistance.

To determine the area of soil and groundwater thus contaminated by the leakage of gasoline, investigative groundwater monitoring wells are installed. These wells are used to measure water elevations and to collect water sample including the liquid phase gasoline present on the groundwater.

The gasoline on the water that flows into the monitoring well and other types of liquid phase petroleum distillates that have migrated through soil and are floating on the groundwater are referred to as "free product" and this term is used herein.

Prior art devices utilize syphon pumps, floating filters, floating skimmers, floating electrical or air pumps.

It is desirable to have a device which operates having no moving parts and which requires no input from an energy source.

SUMMARY OF THE INVENTION

The device comprising the invention herein, simply stated, is made up of two sections, namely, a top collection section and a bottom reservoir section. The collection section absorbs and transfers the free product into the reservoir section for removal at a later time.

The invention embodies no moving parts to collect the free product. For all practical purposes it is maintenance free except for periodic manual draining of the free product collected in the reservoir.

Thus it is a principal object to provide a simply constructed self operative device for collecting the free product and provides for a very simple removal of the collected free product.

These and other objects and advantages of the invention will be set forth in the following description made in connection with the accompanying drawings in which like reference characters refer to similar parts throughout the several views.

BRIEF DESCRIPTION OF THE DRAWINGS

FIG. 1 is a view in vertical section of the adjacent environment showing in front elevation in operating position two of the devices constituting the invention herein;

FIG. 2 is a view of the device in partial vertical section in operating position with a portion broken away and disposed in a monitor well;

FIG. 3 is a view in vertical section similar to that of FIG. 2 showing more detail;

FIG. 4 is a view in horizontal section taken on line 4—4 of FIG. 3 as indicated;

FIG. 5 is a broken view in vertical section of the screen portion of a monitoring well;

FIG. 6 is a broken view in vertical section showing the guard of the device herein;

FIG. 7 is a view in vertical section showing a form of the capillary wick herein;

FIG. 8 is a view in vertical section showing the inner tube of the invention herein and the support member for the capillary wick used; and FIG. 9 is a detail of structure partially in vertical section.

DESCRIPTION OF A PREFERRED EMBODIMENT

Referring to the drawings and in particular to FIG. 1, an environmental underground view 12 is shown in section disclosing a vehicle fuel storage tank 10 having overhead an aboveground pumping facility 11 and spaced therefrom are identical monitor wells 15 and 15' and of which only 15 will be referred to hereafter.

The underground water table is indicated by the reference numeral 17 and also by the industry symbol of a triangle. The free product leakage from said storage tank and from connections to the pumping facility resting upon the water table is indicated at 18.

Said monitor wells are present for testing the presence and level of said free product.

Referring to FIG. 1, the lower portion of said monitor well 15 at the location of the free product and water line interface is composed of a screen material 15b as shown on an enlarged scale in FIG. 5. This allows for the free flow of the groundwater and the free product through the monitor well.

With continued reference to FIG. 2, the monitor well or well casing 15 is shown in broken vertical section. Disposed within said casing in operating position is shown a cylindrical or tubular collector 20 comprising the invention herein. Said collector 20 is hung in position by a cable 30 which is secured in a conventional manner to the upper end of said monitor well casing 15.

As will be made clear, the inventive structure has two basic functions, that of collecting said free product and that of storing it in a reservoir subject to removal.

The collector 20, consists of a cylinder 21 having a slotted portion 21a which is positioned to extend above and below the interface of the water table 17 and the free product 18 for passage therethrough of said water and said free product. Said slots are here shown to be diagonally inclined. Said cylinder is referred to as a guard member.

Said cylinder has a top wall 21b having a central opening or hole 21c therein. Below said cylinder is a reservoir 23 in sealed engagement therewith. Said reservoir has a top wall 23a having a central opening 23b in vertical alignment with said upper opening 21c.

A center pipe 22 having a lower diagonally slotted portion 22a disposed through the opening 21c down to the opening 23b and it is sealed at its bottom as by welding about said opening to said wall 23a.

Said pipe 22 has a threaded portion 22b extending outwardly of said opening 21c and the same is secured in position by a nut 28 having an integral loop 29 thereabove for the attachment of cable 30 as indicated in FIG. 2 for vertically positioning said cylinder as desired.

Within said cylinder 21 and about said center pipe 22 is a tube 25 extending down to said wall 23a to which it is sealed as by welding.

Now, disposed over said tube about said pipe 22 within said cylinder 21 is a wick member 27. Said wick may be variously formed for installation. It is here shown as a sleeve doubled upon itself to be disposed down over said tube 25 extending down the outer and inner sides thereof having engagement at the inner side thereof with said wall 23a.

Said wick is a common hydrophobic polypropylene fibrous material extensively used to clean up petroleum distillate compounds, such as gasoline. This material repels water and absorbs all liquid phase hydrocarbon compounds, such as gasoline, fuel oils and the like.

Attached to the bottom of said reservoir is a conventional drain valve 24.

Said cylinder 20 has a separable sealing engagement with said reservoir 23.

OPERATION

The free product is immiscible with respect to water and as indicated forms a layer atop the water table.

The water and free product at the water table level flow freely through the slots of the cylinder 21. The wick 27 selectively absorbs the free product. Capillary action causes the absorbed free product to spread saturating the exposed wick material. The capillary action continues spreading the absorbed free product up over the top of the tube 25 and then gravitational action begins pulling it down the inner side thereof. The free product will continue moving down said wick at the inner side of said tube and also through the slots thereof to drain into the reservoir through the opening 23a. The siphoning action is thus established through the wick material causing the removal of the free product from the water to be collected in the reservoir.

The free product collected in the reservoir is removed in one way by lifting cylinder 21 out of the monitor well by means of the cable 30 and discharging through the drain valve 24 into a suitable receptacle. The wick member is removed for replacement.

It is seen that the cylinder 21 functions as a guard in providing protection for the wick while at the same time permitting a free flowing access to it of the free product.

It will of course be understood that various changes may be made in form, details, arrangement and proportions of the free product collector and in the steps and sequence of steps of the method without departing from the scope of the invention which, generally stated, consists in an apparatus and method capable of carrying out the objects set forth and the purpose indicated such as disclosed and defined in the appended claims.

What is claimed is:

1. A passive free product collection structure in connection with a monitor well casing, comprising
   a cylindrical member adapted to be suspended within a monitor well casing,
   said cylindrical member having a slotted portion positioned to be at the interface of a water table and the free product,
   a reservoir extending below said cylinder being releasably sealed thereto,
   said cylindrical member and said reservoir respectively having top walls having vertically aligned openings,
   a pipe disposed into said cylinder through said opening therein and extending to said opening of said reservoir,
   said pipe being sealed to said top wall of said reservoir about said opening therein,
   a tube disposed within said cylinder about said pipe being radially spaced therebetween and extending to said top wall of said reservoir, and
   a continuous wick disposed over the sides of said tube, said wick repelling water and by capillary action selectively absorbing and collecting said free product from said water table, a siphoning action being established through said wick to drain said free product into said reservoir.

2. The structure of claim 1, wherein
   said tube being sealed to said top wall of said reservoir.

3. The structure of claim 1, wherein
   said pipe has an upper threaded portion extending upwardly of said cylinder, and
   a nut having an upwardly projecting loop secures said pipe.

4. The structure of claim 1, wherein
   said reservoir has a bottom drain plug.

5. The method of passively collecting a free product from a groundwater monitoring well, consisting of the steps of
   suspending a cylinder in a monitor well casing,
   slotting a portion of the side wall of said cylinder and positioning said slotted portion to be at the interface of a water table and a free product,
   extending a reservoir below said cylinder,
   forming a top wall on said cylinder and a top wall on said reservoir,
   forming vertically aligned holes in said top wall of said cylinder and said reservoir,
   extending a pipe through said hole in said cylinder down to said hole in said top wall of said reservoir and sealing the same to said top wall of said reservoir about said hole therein,
   disposing a tube into said cylinder radially spaced between said pipe and said cylinder,
   overlying the sides of said tube with a wick adapted to selectively absorb said free product and be repellant to water, and
   establishing a siphoning action through said wick to drain said free product into said reservoir.

6. The method of claim 5, including the steps of
   attaching a drain to said reservoir,
   withdrawing said cylinder and reservoir from said well casing, and
   draining said free product from said reservoir.

7. The method of claim 5, including
   slotting the lower portion of said pipe.

8. The method of claim 5, including
   sealing said tube to said top wall of said reservoir.

9. The method of claim 5, including
   sealing said cylinder to said reservoir.

10. The structure of claim 1, wherein
    said wick is formed as a doubled over sleeve.

* * * * *